US008124912B2

(12) United States Patent
Bayer et al.

(10) Patent No.: US 8,124,912 B2
(45) Date of Patent: Feb. 28, 2012

(54) METHOD FOR HEATING COMPONENTS

(75) Inventors: Erwin Bayer, Dachau (DE); Wolfgang Becker, Ulm (DE); Bernd Stimper, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 1517 days.

(21) Appl. No.: 10/585,435

(22) PCT Filed: Dec. 11, 2004

(86) PCT No.: PCT/DE2004/002717

§ 371 (c)(1),
(2), (4) Date: Jul. 27, 2006

(87) PCT Pub. No.: WO2005/067350

PCT Pub. Date: Jul. 21, 2005

(65) Prior Publication Data

US 2009/0107968 A1 Apr. 30, 2009

(30) Foreign Application Priority Data

Jan. 8, 2004 (DE) ........................ 10 2004 001 276

(51) Int. Cl.
*B23K 26/00* (2006.01)

(52) U.S. Cl. .......... 219/121.76; 219/121.62; 219/121.85

(58) Field of Classification Search ............. 219/121.64, 219/121.66, 121.76, 121.85, 121.62, 121.83, 219/121.6
See application file for complete search history.

(56) References Cited

U.S. PATENT DOCUMENTS 4,229,640 A * 10/1980 Castellani Longo ....... 219/121.6
4,963,714 A * 10/1990 Adamski et al. ......... 219/121.64
5,073,212 A * 12/1991 Frohlich ....................... 148/566
5,705,788 A * 1/1998 Beyer et al. .............. 219/121.66
(Continued)

FOREIGN PATENT DOCUMENTS

DE 4234342 A1 * 4/1994
(Continued)

OTHER PUBLICATIONS

Machine translation of Japan Patent No. 10-113,833, May 2010.*

*Primary Examiner* — Geoffrey S Evans
(74) *Attorney, Agent, or Firm* — W. F. Fasse; W. G. Fasse

(57) ABSTRACT

A processing area of a structural component, such as a gas turbine component, is heated by irradiation with several laser sources prior to and/or during and/or after carrying out a processing such as a deposit welding or machining of the component on the processing area. For the heating, each laser source directs a respective energy beam onto the processing area, which respectively produces an energy spot on the processing area. The respective positions of the energy spots are static or quasi-static on the processing area. The energy spots jointly heat the processing area.

13 Claims, 3 Drawing Sheets

U.S. PATENT DOCUMENTS

| | | | | | |
|---|---|---|---|---|---|
| 5,859,405 | A | * | 1/1999 | Golz et al. | 219/121.6 |
| 5,886,313 | A | * | 3/1999 | Krause et al. | 219/121.6 |
| 5,886,878 | A | * | 3/1999 | Khadem et al. | 228/180.1 |
| 5,913,555 | A | * | 6/1999 | Richter et al. | 29/889.1 |
| 6,014,401 | A | * | 1/2000 | Godard et al. | 219/121.61 |
| 6,106,891 | A | * | 8/2000 | Kulesza et al. | 228/180.1 |
| 6,251,328 | B1 | * | 6/2001 | Beyer et al. | 219/121.76 |
| 6,269,540 | B1 | * | 8/2001 | Islam et al. | 29/889.7 |
| 6,538,233 | B1 | * | 3/2003 | Lee et al. | 219/121.85 |
| 6,626,350 | B2 | * | 9/2003 | Meier | 228/119 |
| 6,769,599 | B1 | * | 8/2004 | Momeni et al. | 228/180.22 |
| 2002/0091459 | A1 | * | 7/2002 | Meier | 29/889.1 |
| 2002/0148818 | A1 | * | 10/2002 | Satou et al. | 219/121.76 |
| 2003/0150842 | A1 | * | 8/2003 | Mikame | 219/121.6 |
| 2005/0109953 | A1 | * | 5/2005 | Otsu et al. | 219/121.6 |

FOREIGN PATENT DOCUMENTS

| | | | | |
|---|---|---|---|---|
| DE | 19720652 | A1 | * | 11/1997 |
| EP | 836905 | A1 | * | 4/1998 |
| JP | 7-311093 | A | * | 11/1995 |
| JP | 10-113833 | A | * | 5/1998 |
| JP | 2002-219593 | A | * | 8/2002 |
| JP | 2003-290945 | A | * | 10/2003 |
| SU | 1576237 | A | * | 7/1990 |
| WO | WO-00/11921 | A | * | 3/2000 |

* cited by examiner

METHOD FOR HEATING COMPONENTS

FIELD OF THE INVENTION

The invention relates to a method for heating of structural components prior to and/or during and/or after a further machining thereof.

BACKGROUND INFORMATION

Structural components, such as for example turbine blades of gas turbines, must be heated during production or maintenance work or for repair thereof for the performance of most varied working or processing operations. Such heating is also referred to as pre-heating. It is also customary to heat gas turbine structural components subsequent to a working operation in the sense of a heat treatment.

In connection with the maintenance of turbine blades, so-called deposit welding is used, for example. In connection with the deposit welding, pre-heating to a desired process temperature of a machining (or working) area or welding area of the turbine blades to be welded is required. A reliable deposit welding can be performed only when the turbine blade to be welded has been heated at least in the machining area to the process temperature and is kept at the desired process temperature during the deposit welding.

According to the prior art, so-called inductive systems are used for heating or pre-heating of structural components. Such inductive systems may involve coils, for example, which heat the structural component based on an inductive energy introduction. The heating or pre-heating of structural components by means of inductive systems has the disadvantage that during the heating or pre-heating high-temperature tolerances of up to 50° C. may develop at the structural component to be heated. Such an inexact temperature distribution on the structural component to be heated is disadvantageous. Moreover, such inductive systems consume very much energy. Another disadvantage of inductive systems resides in the fact that during the heating or pre-heating, higher temperatures may develop inside the structural component than on the surface of the structural component. This may lead to damages of the structural component.

SUMMARY OF THE INVENTION

Starting from the foregoing, the invention is based on the problem to provide a new method for heating structural components.

The above object has been achieved according to the invention in a method of heating a processing area of a structural component. According to the invention, the processing area or machining area (area to be processed or worked) is irradiated by several laser sources for heating, whereby each laser source directs an energy beam onto the machining area in such a way that each laser source produces one respective energy spot on the machining area, which energy spots together heat the machining area, and whereby each of the laser sources produces a static or quasi-static (stationary or quasi-stationary) energy spot on the machining area in such a way that the position of the respective energy spot on the machining area is stationary or quasi-stationary. Thereby, it is possible to avoid problems which occur in connection with an inductive heating. Furthermore, difficulties which can occur when the energy spots move due to the motion of the laser source, are avoided.

According to an advantageous embodiment of the invention, a temperature measuring device is allocated to each laser source, which device measures the heating of the machining area produced by the respective laser source or rather by the energy spot of the respective laser source and compares the measured heating with a respective temperature rated value, whereby, depending on the comparing, the radiation energy of the respective energy beam is individually fixed for each of the laser sources. Hereby optimal preconditions are given for adapting the heating of the structural component or the machining area to the varying structural component cross sections.

Preferably, each of the laser sources produces a quasi-stationary energy spot on the machining area in such a way that the position of the respective energy spot on the machining area varies maximally between respective neighboring energy spots in order to thereby heat the transition area between two neighboring energy spots. Thereby, a still more homogeneous heating of the machining area is achievable while simultaneously avoiding the problems of movable systems.

BRIEF DESCRIPTION OF THE DRAWINGS

Preferred further embodiments of the invention are derived from the dependent claims and the following description. Example embodiments of the invention will be explained in more detail with reference to the drawing without being limited thereto. Thereby, the Figures show:

DETAILED DESCRIPTION OF EXAMPLE EMBODIMENTS OF THE INVENTION

Figure 1:
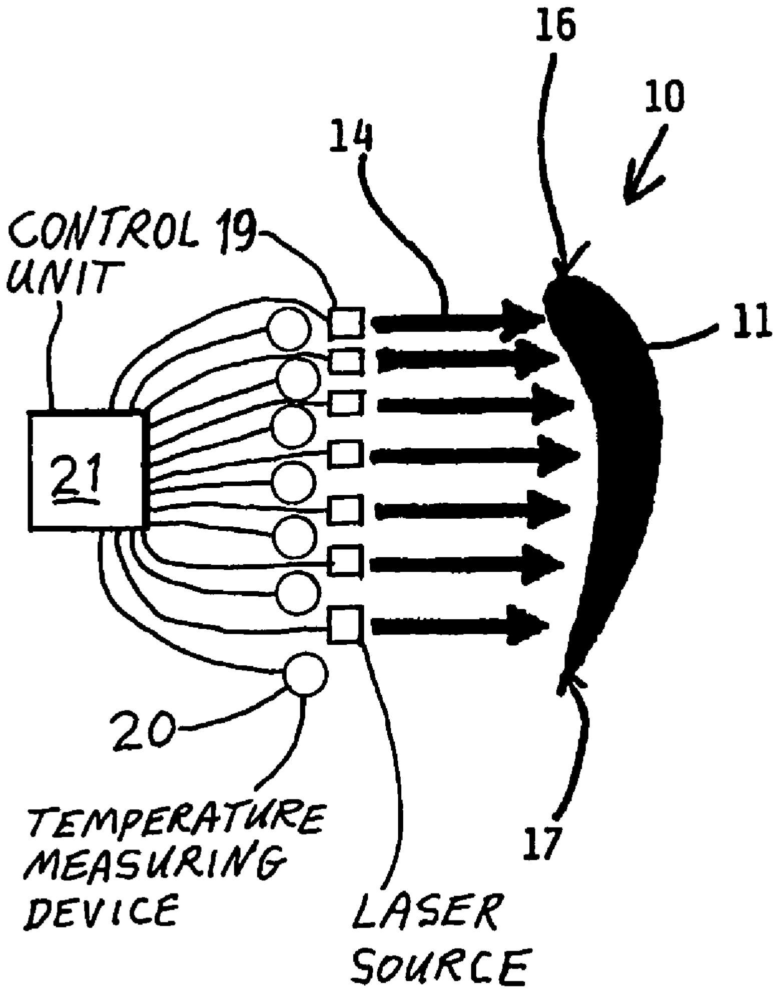
FIG. 1 a substantially schematized arrangement with a structural component to be heated shown in cross-section for illustrating a first embodiment of the method according to the invention.
Figure 2:
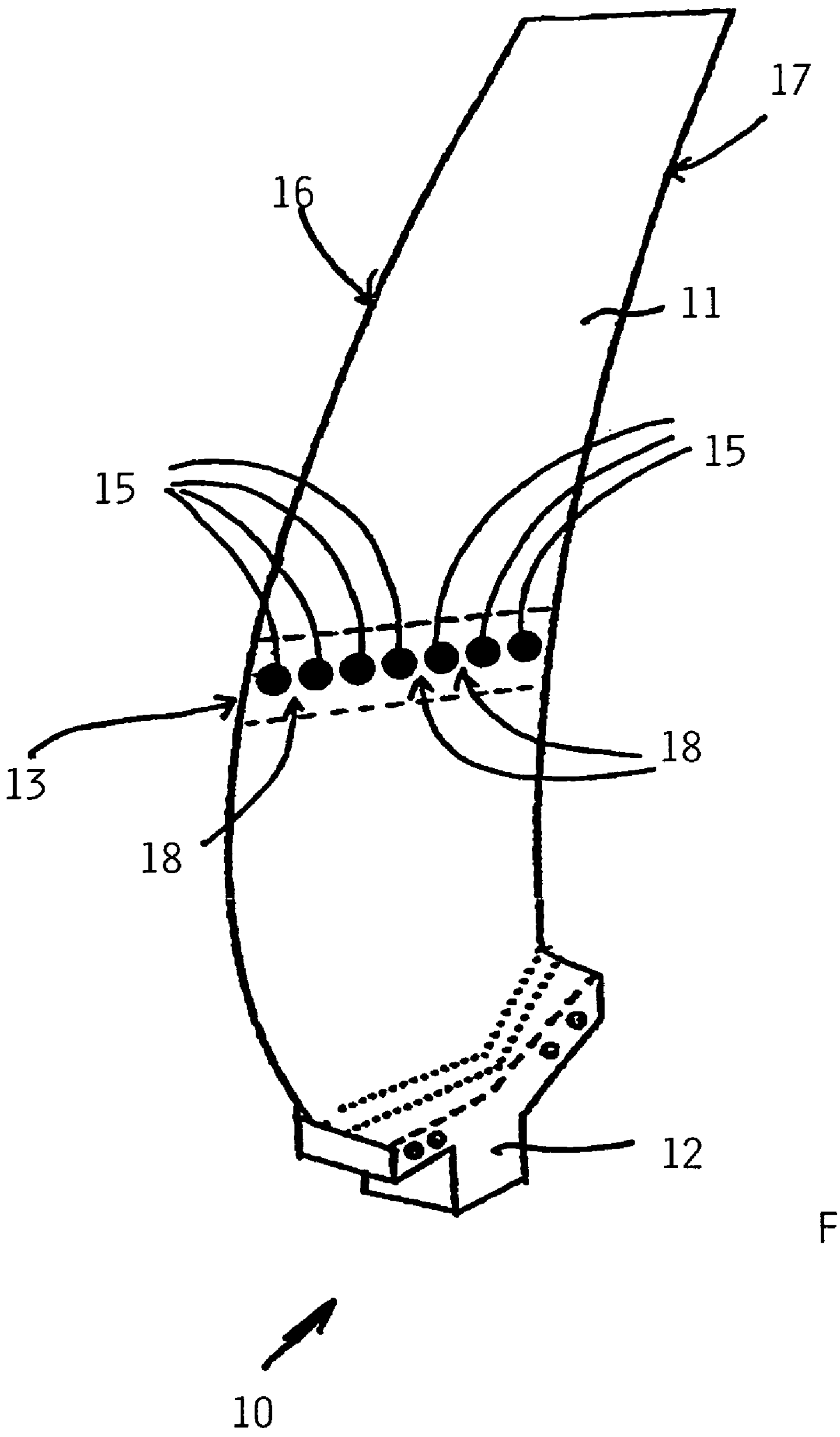
FIG. 2 a substantially schematized arrangement with the structural component to be heated shown in a side view for the further illustration of the first embodiment of the method according to the invention.
Figure 3:
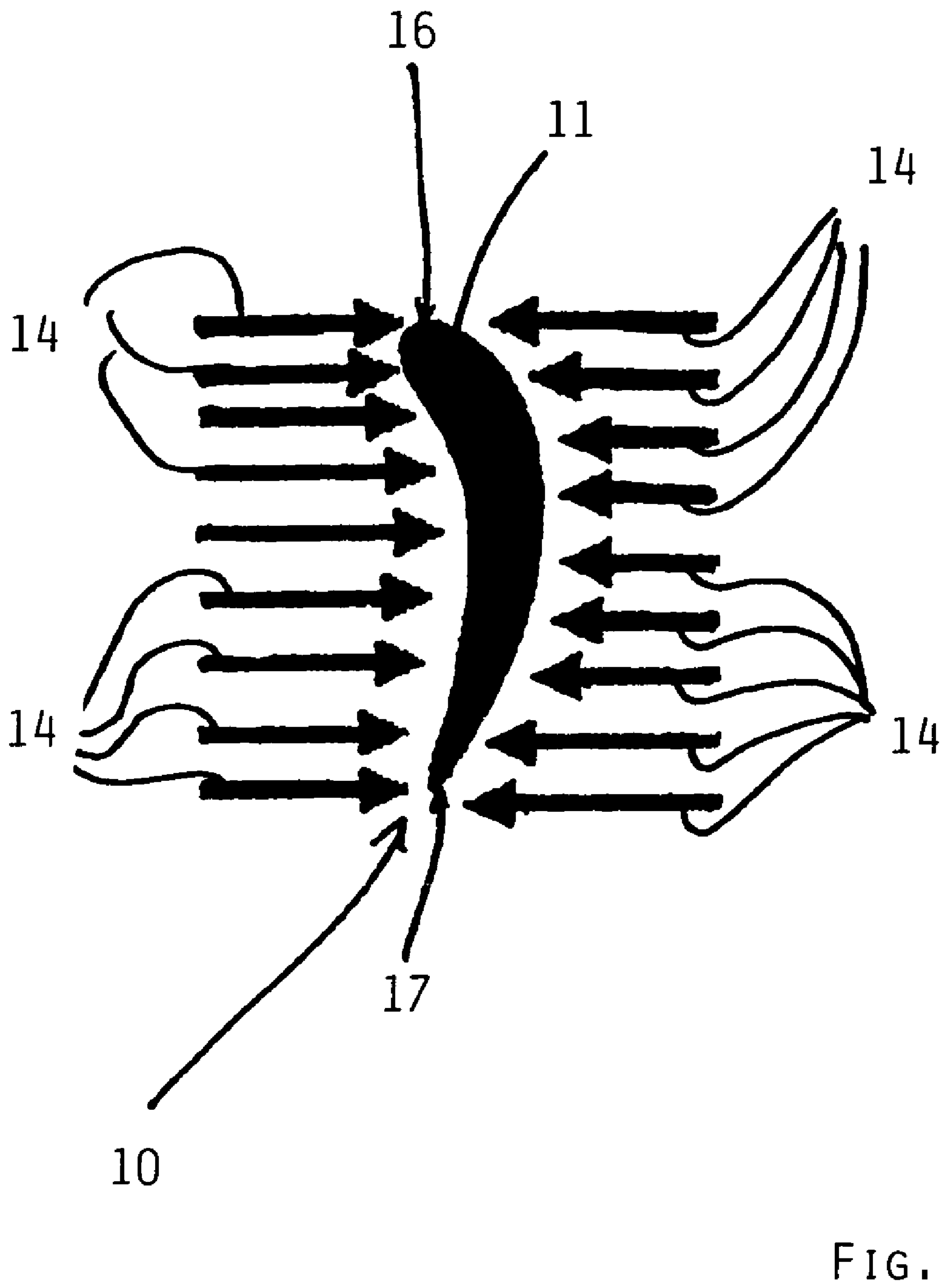
FIG. 3 a substantially schematized arrangement with a structural component to be heated shown in cross-section for illustrating a second example embodiment of the method according to the invention.

In the following, the method according to the invention for heating or pre-heating of structural components is described with reference to FIGS. 1 to 3 illustrating the pre-heating of a turbine blade of a gas turbine.

FIG. 1 shows, in a substantially schematized manner, a turbine bucket 10 of a high-pressure turbine of an aircraft engine, in a cross-section, namely through a blade 11 of the turbine bucket 10. FIG. 2 shows the turbine bucket 10 in a side view whereby a blade foot or root of the blade 11 is designated with reference number 12. It is within the teaching of the present invention to heat the turbine bucket 10 of the high-pressure turbine prior to and/or during and/or after a further machining of the same, namely in a machining (working) area 13 of the blade 11 shown in FIG. 2.

According to the present invention, the turbine bucket 10 is irradiated on one side by several laser sources 19 for heating the machining area 13, as shown in FIGS. 1 and 2, whereby each of the laser sources 19 respectively directs an energy beam 14 onto the machining area 13 of the turbine bucket 10. FIG. 1 shows a total of seven of such energy beams 14. The energy beams 14 produce on the turbine bucket 10, namely in the machining area 13 thereof, respective energy spots 15.

The energy spots 15 together heat the machining area 13 of the turbine bucket 10. The energy spots 15 are dot-shaped or circular.

According to the present invention, the laser sources 19 produce stationary or quasi-stationary energy spots 15 in the machining area 13 of the turbine bucket 10. The term stationary energy spot is intended to mean that the position of the respective energy spot in the machining area 13 is "static", thus it does not change. On the other hand in connection with a quasi-stationary energy spot a small motion of the same is possible.

In a first alternative embodiment of the present invention, the laser sources produce stationary energy spots. More specifically, the position of the respective energy spots 15 in the machining area 13 does not change. If the spacing between such stationary energy spots is selected to be small enough, it is possible to obtain a homogeneous heating of the entire machining area 13.

According to an alternative of the present invention, the laser sources 19 produce quasi-stationary energy spots 15 in the machining area 13. In connection with a quasi-stationary energy spot 15 a small motion of the same within the machining area 13 is permissible, whereby a position of an energy spot 15 changes maximally between the respective immediately neighboring energy spots 15. Thereby, an even more homogeneous heating of the machining area 13 can be achieved, namely preferably in the transition area 18 between two neighboring energy spots 15.

A temperature measuring device 20 is allocated to each laser device 19. Each of the temperature measuring devices 20 measures or ascertains the heating caused by the respective laser source 19 or by the respective energy spot 15 in the machining area 13 of the turbine bucket 10. The actual temperature values ascertained by each of the temperature measuring devices 20 are compared in a control unit 21 with a respective rated temperature value. Thus, a separate temperature rated value is allocated to each laser device 19 or each energy spot 15 produced by the respective laser device.

The radiation power of the respective energy beam 14 and thus the power of the respective energy spot 15 of each laser device is individually adapted on the basis of this temperature rated value. Thus, a pre-defined temperature profile can be exactly adjusted in the machining area 13. Furthermore, in this manner it is possible to take into account the varying cross-section of the turbine bucket 10 along the machining area. Thus, FIG. 1 namely shows that the cross-sectional profile of the turbine bucket 10 noticeably varies between the edges 16 and 17. In so far, with the help of the present invention the radiation energy can be easily adapted with certainty to the cross-section of the turbine bucket 10 that varies over the machining area 13.

In the example embodiment of FIGS. 1 and 2, the machining area 13 of the turbine bucket 10 is heated from one side by laser sources 19. In distinction hereto, in the example embodiment shown in FIG. 3, it is possible to heat the machining area 13 from two sides. Thus, in the example embodiment of FIG. 3, energy beams 14 are directed onto the machining area 13 from both sides of the turbine bucket 10. Thereby, the quality of the heating can be still further improved.

In accordance with the present invention, diode lasers are preferably used as the laser sources 19. The use of diode lasers which have a linear power output in response to a linear control is particularly preferred. Diode lasers make it possible to direct the radiation energy with a narrowly limited specific wavelength onto the turbine bucket 10 or onto the machining area 13 to be heated. The defined wavelength of the diode lasers makes possible a good and defined limitation of the energy spreading and a precise heating of the turbine bucket 10 or rather of the machining area 13. However, alternatively other laser sources can be used for the heating, for example a $CO_2$-laser, an Nd-laser or a YAG-laser should be mentioned here.

The heating as well as the measuring of the heating at the turbine bucket 10 takes place in a contactless manner. Pyrometers are particularly used for a contactless temperature measurement. As already mentioned, a pyrometer 20 is allocated to each laser source 19 in order to ascertain the heating caused by the respective laser source.

The invention is preferably used in the heating of turbine buckets 10 in connection with a repair or a maintenance work of the same. A machining that requires heating of the turbine bucket is for example the so-called deposit welding. The use of the method according to the invention is, however, not limited to repair works on turbine buckets. Rather, the present method can also be used on other structural components of a gas turbine, for example, when repairing a housing.

The invention claimed is:

1. A method of processing a structural component, comprising:

a) providing a structural component that has a processing area which is to be processed;

b) producing plural energy beams respectively individually from plural laser sources;

c) heating the processing area of the structural component by directing the plural energy beams respectively from the plural laser sources onto the processing area while the laser sources remain stationary relative to the processing area of the structural component, whereby the plural energy beams respectively individually form plural energy spots at respective locations on the processing area and the energy spots heat the processing area of the structural component, and wherein during the heating each respective one of the energy spots respectively remains stationary relative to the processing area;

d) respectively individually measuring the heating that is respectively caused by each respective one of the energy spots at the respective locations on the processing area by respectively individually measuring respective actual measured temperature values at the respective locations on the processing area using plural temperature measuring devices that are respectively individually allocated to the plural laser sources;

e) respectively individually controlling the plural laser sources in response to the respective actual measured temperature values; and f) performing a mechanical processing, distinct from and in addition to the heating, on the processing area of the structural component, at a time that is at least one of before or during or after the heating.

2. The method according to claim 1, wherein the mechanical processing comprises mechanically machining the processing area.

3. The method according to claim 1, wherein the mechanical processing comprises deposit welding on the processing area, which is performed during or after the heating when the processing area has thereby been heated to and is at a process temperature required by the deposit welding.

4. The method according to claim 1, wherein the energy spots do not overlap one another.

5. The method according to claim 4, wherein the energy spots are respectively spaced apart from one another with spacing distances therebetween.

6. The method according to claim 1, further comprising providing rated temperature values that are respectively individually allocated to the locations on the processing area, and respectively individually comparing the actual measured temperature values with the rated temperature values to produce respective individual comparison results that are respectively allocated to the laser sources, and wherein the controlling of the laser sources comprises respectively individually controlling the respective output power of the laser sources respectively individually in response to the comparison results that are respectively allocated to the laser sources.

7. The method according to claim 6, wherein the controlling of the output power comprises individually controlling individual output power values of the energy beams dependent on the comparison results so as to respectively individually adjust the actual measured temperature value toward or to the rated temperature value respectively individually for each respective one of the energy spots.

8. The method according to claim 6, further comprising producing a varying profile of the output power values allocated to the respective locations on the processing area dependent on a varying cross-sectional profile of the structural component along the processing area.

9. The method of claim 1, wherein the locations are sufficiently close to one another and the controlling is performed so that the heating of the processing area by the plural energy spots produces a homogeneous heating over an entirety of the processing area.

10. The method of claim 1, wherein the mechanical processing is performed before the heating.

11. The method of claim 1, wherein the mechanical processing is performed after the heating.

12. The method of claim 1, wherein the mechanical processing is performed during the heating.

13. The method of claim 1, wherein the structural component is a structural component of a gas turbine.

* * * * *